(No Model.)
2 Sheets—Sheet 1.
H. S. ALBRECHT.
MACHINE FOR MAKING ARTIFICIAL FUEL.
No. 538,475.  Patented Apr. 30, 1895.
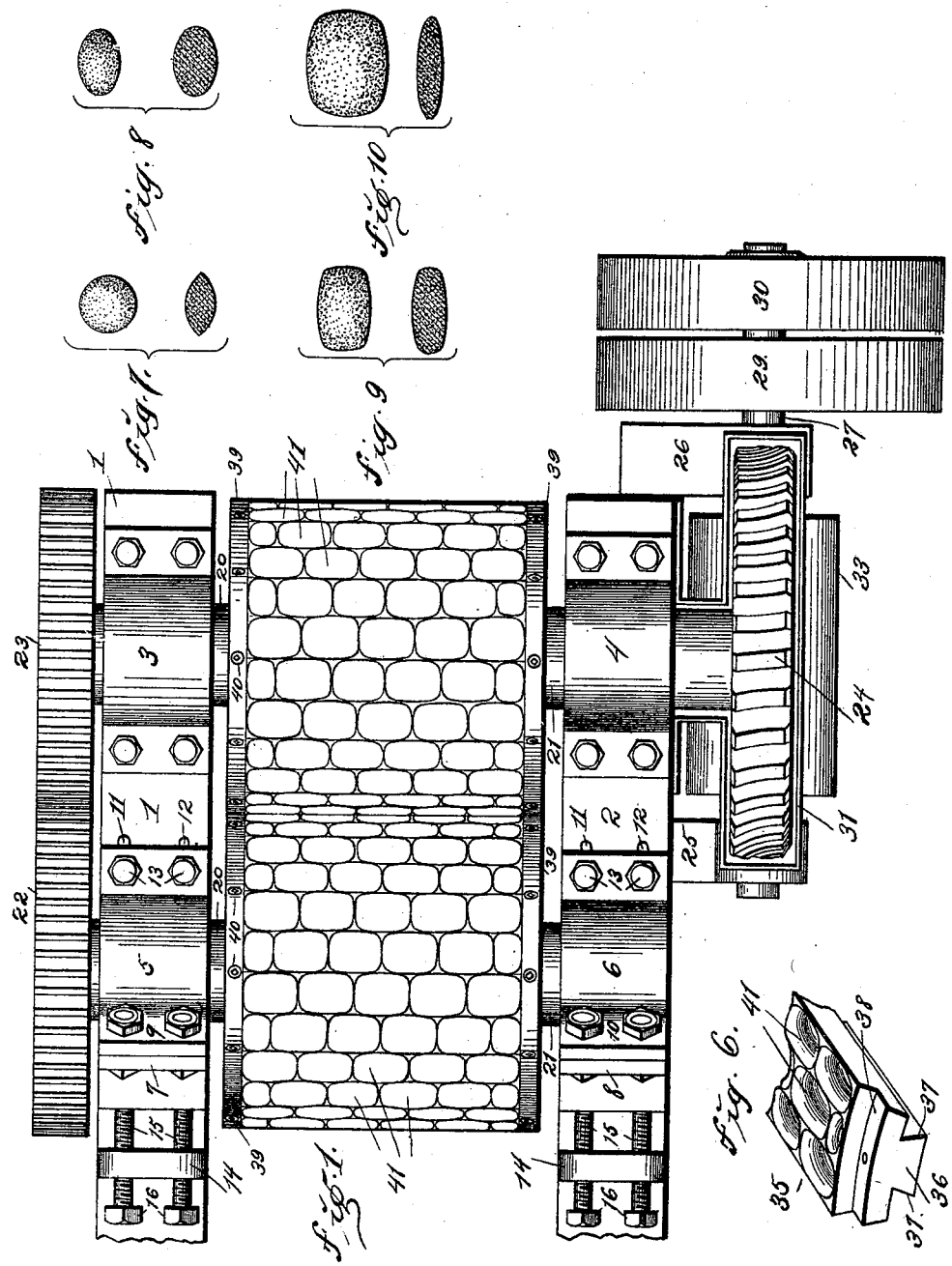

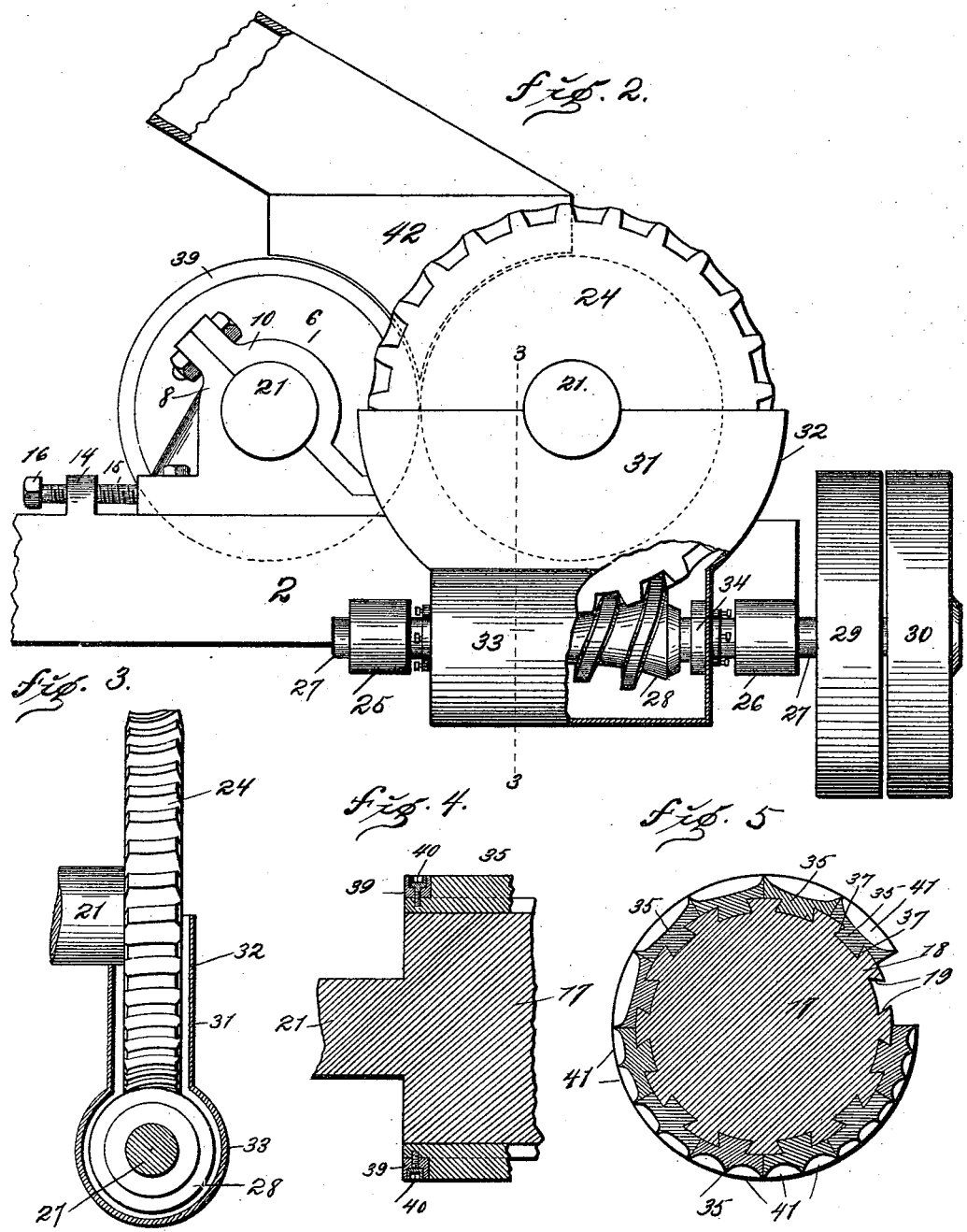

UNITED STATES PATENT OFFICE.

HERMAN S. ALBRECHT, OF ST. LOUIS, MISSOURI.

MACHINE FOR MAKING ARTIFICIAL FUEL.

SPECIFICATION forming part of Letters Patent No. 538,475, dated April 30, 1895.

Application filed March 5, 1894. Serial No. 502,337. (No model.)

*To all whom it may concern:*

Be it known that I, HERMAN S. ALBRECHT, of the city of St. Louis, State of Missouri, have invented certain new and useful Improvements in Machines for Making Artificial Fuel, of which the following is a full, clear, and exact description, reference being had to the accompanying drawings, forming a part hereof.

The object of my invention is to provide an improved machine for making fuel blocks or cakes from disintegrated material, and it consists in the novel construction, combination and arrangement of parts, hereinafter described and claimed.

Referring to the drawings, Figure 1 is a top plan view of my complete machine. Fig. 2 is a side elevation of my machine, portions being broken away to more clearly illustrate the same. Fig. 3 is a detail vertical sectional view taken on the line 3 3 of Fig. 2. Fig. 4 is a sectional view of one end of one of the rollers used in my machine and showing the means of fastening the molds upon the rollers. Fig. 5 is a cross-sectional view through the center of one of the rollers. Fig. 6 is a perspective view of the end of one of the molds or dies I make use of. Figs. 7, 8, 9, and 10 show top sectional views of the different forms of fuel such as is produced by my machine.
Similar numerals refer to similar parts throughout the several views.

The numerals 1 and 2 designate the mating side-frames of my machine, which are preferably rectangular in cross-section, and of any suitable length and size. Upon the upper surfaces of these side frames 1 and 2, and near the ends thereof, are the stationary bearings 3 and 4. A suitable distance to the rear of these stationary bearings 3 and 4 are the sliding bearings 5 and 6. These sliding bearings are constructed of the base portions 7 and 8, which are fitted with the mating caps 9 and 10, said caps being held to the base portions by bolts, or in any ordinary manner. Mating slots 11 and 12 are formed in the side-frames 1 and 2. Bolts 13 extend downwardly through these slots 11 and 12, and are provided with nuts upon their lower ends.

Upwardly extending lugs 14 are cast integral with the side frames 1 and 2, and are located a short distance in the rear of the sliding boxes 5 and 6. Extending longitudinally through these integral lugs 14 are mating screw-threaded bolts 15, having the heads 16 thereon, the forward ends of said bolts engaging against the lower portion of the base-plates 7 and 8.

Referring now to Figs. 4 and 5, the rollers carrying the molds or dies will be described. (These rollers being identical, but one will be described). The body of the roller is designated by the numeral 17, is circular in form, and has a series of radially projecting portions 18 provided with the dovetail edges 19. Formed integral with the main roller are stub-shafts or trunnions 20 and 21. The trunnions 20 are located within the bearings 3 and 5, and extend through and past said bearings, and have securely located on their outer ends the meshing gear-wheels 22 and 23. The trunnions 21 are located in the bearings 4 and 6. The trunnion located within the stationary bearing 4 extends a short distance beyond said bearing and has securely mounted thereon a worm-wheel 24. Running in bearings 25 and 26, located on the lower side of the side-frame 2, is a shaft 27, upon which is rigidly located and held a worm 28, which meshes with the worm-wheel 24. On the forward end of the shaft 27 are located tight and loose pulleys 29 and 30, the tight pulley 30 being for the purpose of receiving a belt to give motion to the machine, the loose pulley 29 being for the purpose of receiving the belt while the machine is not in operation. A sheet metal casing 31, the upper portion 32 of which incloses the lower half of the worm-wheel 24 and the lower portion 33 of which incloses the worm, is secured to the forward end of the side-frame 2, and is for the reception of lubricating oil. Suitable stuffing-boxes 34 are provided upon the interior of this casing 31 around the shaft 27, and serve to retain the oil upon the inside of said casing. It is the intention to always keep this casing partially filled with oil, so that the worm engaging upon the worm-wheel will run easily and with a small amount of friction.

The dies or molds are designated by the numeral 35, are rectangular in cross-section, and have integral projections 36 upon their inner sides provided with the dovetail edges 37, which engage the dovetails 19 upon the radial projections 18 on the main roller previously mentioned. The ends of these molds or dies 35 are provided with rectangular cut-away portions 38, more clearly shown in Fig. 6. When the molds or dies 35 are all in position upon the rollers, a ring 39 rectangular in cross-section, is slipped upon the ends of the molds 35 and upon the rectangular cut-away portions 38. Set-screws 40, passing through this ring 39 and into the ends of the molds 35, serve to securely hold the rings upon the ends of the molds and the molds upon the rollers. This construction is more clearly set forth in Fig. 4. The outer surface of these molds 35 may be provided with differently formed or sized indentations 41, but to accomplish the desired result the indentations in the mold upon one roller must coincide with the indentations upon the mating mold-plate of the mating roller.

A hopper 42 is placed directly over the mating rollers, and into which the chute from the disintegrator discharges. Thus is provided means for equally distributing over the two rollers the disintegrated coal, or other like fuel, to be formed into cakes or blocks.

By reason of the dovetail-connection between the molds or dies and the rollers upon which the former are mounted, said molds or dies can only be placed in position and removed by a longitudinal movement. In other words, the said molds or dies cannot be placed in position or removed until the dovetail portions of the former engage corresponding portions of the said rollers, which can only be brought about by a relatively longitudinal movement of said dies and rollers. By this construction also the dies are more securely held in position against displacement by centrifugal force than they would be if said dies were held in position only by the rings 39 and set-screws 40.

The operation of my improved device is as follows: When the desired molds or dies are placed upon the roller and secured thereto by the rings 39 and set-screws 40, motion is imparted to said rollers by means of the worm-wheel 24 meshing with the worm 28 upon the shaft 27, which shaft 27 has the tight-pulley 30 located thereon. Disintegrated coal or other like fuel being fed into the hopper 42 will necessarily fill the spaces or indentations 41 in the mold-plates 35, and as said plates pass their meeting points, the cake or tablet of fuel will be formed and drop into a suitable receptacle after it is released from the molds as they separate from each other. Should lateral adjustment be desired, the operator can get such correct adjustment by manipulating the screw-bolts 15 engaging against the sliding boxes 5 and 6.

The preferred forms of fuel manufactured by this machine are clearly shown in Figs. 7, 8, 9 and 10, though many other sizes and forms can be easily manufactured.

By the use of this machine all of the fine coal that is now ordinarily thrown away or wasted can be utilized, thereby decreasing the cost of such manufactured fuel.

Thus it will be seen how I have formed a simple, compact and durable machine for forming cakes or tablets of fuel from disintegrated coal and like products.

What I claim is—

In a machine for forming into cakes or tablets disintegrated coal, &c., the combination of the mating side frames 1 and 2, stationary boxes 3 and 4 located upon said frames, laterally adjustable sliding boxes 5 and 6 located upon said side-frames 1 and 2, mating rollers 17 provided with integral dovetail projections 18 adapted to receive mating mold or die-plates 35, rings 39 and set-screws 40 for normally holding said mold or die-plates upon the rollers, a worm-wheel 24 rigidly secured to the shaft of one of the rollers, a worm 28 meshing with said worm-wheel, a shaft 27 upon which said worm 28 is mounted, a sheet metal casing 31 inclosing said worm and partially inclosing said worm-wheel, and tight and loose pulleys 29 and 30 mounted upon said shaft 27, all to operate in the manner set forth and for the purposes specified.

In testimony whereof I affix my signature in presence of two witnesses.

HERMAN S. ALBRECHT.

Witnesses:
M. GRIFFIN,
JNO. C. HIGDON.